United States Patent [19]

Bidefeld

[11] Patent Number: 5,054,980
[45] Date of Patent: Oct. 8, 1991

[54] COMPOSITE WELDABLE STUD AND METHOD OF USING SAME

[75] Inventor: Branko Bidefeld, Amherst, Ohio
[73] Assignee: TRW Inc., Cleveland, Ohio
[21] Appl. No.: 590,025
[22] Filed: Sep. 28, 1990
[51] Int. Cl.⁵ ............... F16B 37/06; B23K 20/12; B23K 37/00
[52] U.S. Cl. .................. 411/171; 411/258; 403/271; 403/343; 228/2
[58] Field of Search .......... 411/82, 171, 258; 403/271, 272, 343; 228/2, 111, 112, 113, 114; 29/525.1

[56] References Cited

U.S. PATENT DOCUMENTS

| | | | |
|---|---|---|---|
| 4,256,253 | 3/1981 | Nishiwaki | 228/2 |
| 4,735,353 | 4/1988 | Thomson et al. | 228/2 |
| 4,850,772 | 7/1989 | Jenkins | 411/171 |

Primary Examiner—Neill R. Wilson
Attorney, Agent, or Firm—Allen D. Gutchess, Jr.

[57] ABSTRACT

A composite, friction weldable stud is used to affix a first plate to a second plate made of dissimilar materials. The stud has a first body made of material compatible with the first plate, with the body having a shank and a collar extending outwardly therefrom of a predetermined diameter. The collar has a first surface extending toward the shank with grooves to mate with cooperating ridges of a chuck of a friction-welding tool. The stud further includes a second body of material compatible with the second plate. The second body has a friction-weldable nose extending outwardly from the collar and substantially coaxial with an axis of the first body. The first and second bodies have cooperating threaded for affixing the two bodies together so that they can move as a unit. A hole is formed in the first plate which is larger than the nose but smaller than the collar. The nose is placed through the first hole into contact with the second plate. The stud is then welded to the first and second plates by friction-welding with the nose welded to the second plate and the periphery of the collar welded to the first plate around the hole.

18 Claims, 2 Drawing Sheets

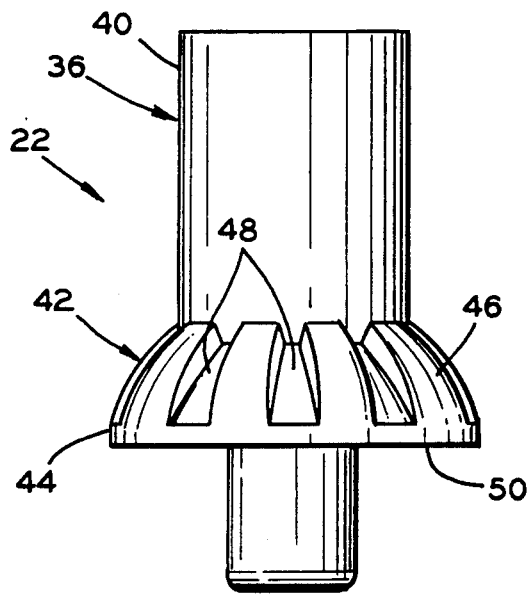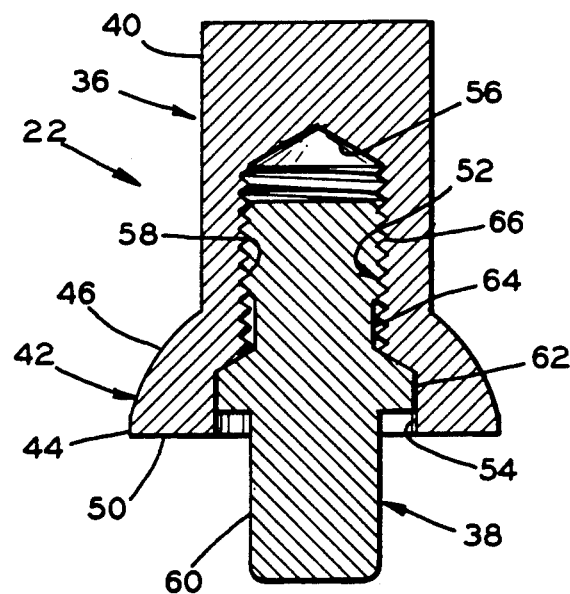
FIG. 3  FIG. 4
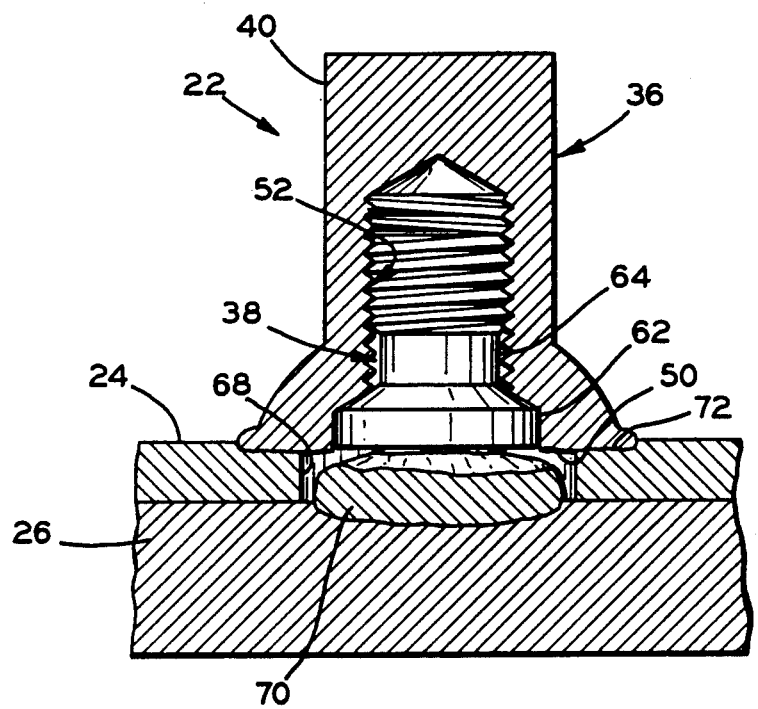
FIG. 5

COMPOSITE WELDABLE STUD AND METHOD OF USING SAME

This invention relates to a weldable stud and method for using the stud to affix a first plate to a second plate made of dissimilar materials.

A weldable stud in accordance with the invention is of a friction-weldable, composite type, in a preferred form. The stud includes a first body of metal having a shank with a collar extending outwardly from the shank near one end thereof. The collar has a first surface facing toward the other end of the shank with generally radially-extending grooves extending from the shank to the periphery of the collar for engagement by a cooperating surface of a welding tool chuck. The tool can apply both rotational and axial forces to the stud collar through the chuck. The collar has a second annular surface facing away from the other end of the shank. The stud further includes a second body of a different metal having a weldable nose extending from the collar in a direction away from the shank, with the nose having an axis which is substantially coaxial with an axis of the shank. The first and second bodies have cooperating means for affixing the bodies together whereby they rotate and move axially together. The cooperating means can be in the form of threads or other means, such as non-circular portions held by crimping or swaging, or weld metal.

In affixing a first plate to a second plate made of dissimilar materials, a composite stud is provided which has the first body made of a material which is compatible with the material of which the first plate is made. The stud further has the second body made of material which is compatible with the material of which the second plate is made. Holes are formed in the first plate in positions where the first plate is to be affixed to the second plate, with the holes having a maximum dimension which is less then the maximum dimension across the stud collar. Specifically, where the holes and collar are round, the diameter of the holes is less than the diameter of the collar. The length of the nose of the second body of the stud also has a length exceeding the thickness of the first plate. The stud is then placed centrally in the hole of the first plate with the nose of the stud pressed against the surface of the second plate. The stud is then rotated at high speed to cause the material at the end of the nose to become plastic and the stud to move toward the plates. The periphery of the collar then engages the outer surface of the first plate to cause the material at the periphery of the collar to become plastic and welded to the outer surface of the second plate. The two welds thus occur partly sequentially and then partly simultaneously toward the end of the weld cycle. The weld between the periphery of the collar and the outer surface of the first plate forms a seal to prevent fluids from entering between the collar and the first plate, which otherwise could cause rapid corrosion or deterioration of the second body of the stud and the second plate.

The stud and method of using it in accordance with the invention can be used to fasten a number of plates of dissimilar materials together. A particular application involves the use of liners for coal-burning plant stacks, scrubbers, and ducts. With flue gas desulfurization systems, liner plates made of materials such as titanium or certain nickel alloys can be affixed to underlying plates of carbon steel, by way of further example. Desulfurization involves the use of scrubbers which employ corrosive materials, such as sulfuric acid or alkaline reagent, as the scrubbing chemical. Such can cause liner failures in a fraction of the design life. With the use of the corrosion-resistant plates, e.g. titanium or nickel alloy, over the steel plates of the basic structure, the useful life can be extended considerably.

It is, therefore, a principal object of the invention to provide a friction-weldable, composite stud having two bodies of dissimilar materials for affixing together two plates of dissimilar materials.

Another object of the invention is to provide a method for affixing together two plates of dissimilar materials with the use of friction-weldable, composite studs.

Yet another object of the invention is to affix one metal plate to a second metal plate of dissimilar material by welding a composite stud to an outer surface of the second plate and to an outer surface of the first plate around a periphery of a hole formed in the first plate.

Many other objects and advantages of the invention will be apparent from the following detailed description of preferred embodiments thereof, reference being made to the accompanying drawings, in which:

FIG. 3 is an enlarged view in elevation of a friction-weldable composite stud in accordance with the invention;

FIG. 4 is a view in longitudinal cross section of the composite stud of FIG. 3; and FIG. 5 is a view in section taken through the stud of FIGS. 3 and 4 when welded to two dissimilar plates or workpieces.

Figure 1:
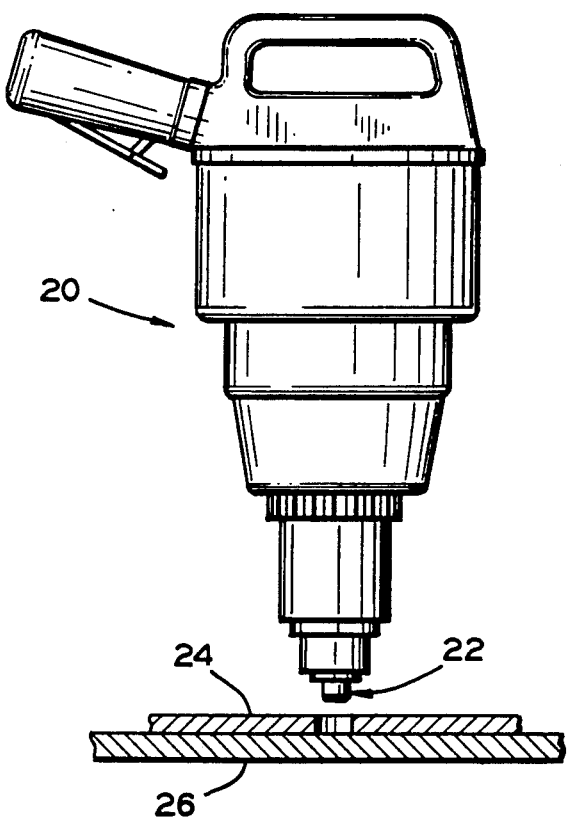
FIG. 1 is a schematic view in elevation of apparatus for welding a stud to two plates in accordance with the invention.

Referring to FIG. 1, a welding tool indicated at 20 is used to weld a friction-weldable, composite stud 22 to a first workpiece or outer plate 24 and a second workpiece or inner plate 26. The two plates can be of dissimilar materials and specifically dissimilar metals. The welding tool can be of the type shown in U.S. Pat. No. 4,702,405, issued Oct. 27, 1987, or other types known in the art. The friction welding tool 20 has means for providing relative movement between the stud and the workpiece, usually by rotating the stud at high speed, in a range of 6,000–12,000 rpms, for example. The tool is also suitably supported and backed up for applying axial force to the stud in order to establish high pressure between the stud and the workpiece, as is known in the art.

Figure 2:
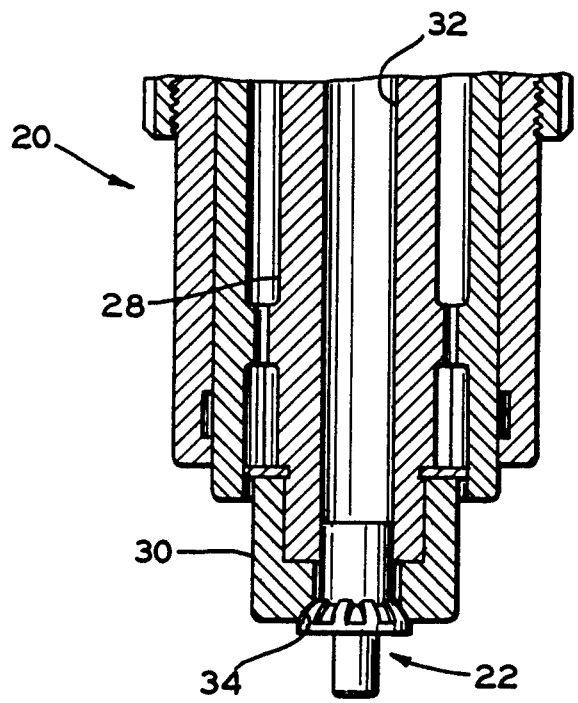
FIG. 2 is an enlarged, fragmentary, schematic view in vertical cross section taken through a chuck portion of the tool of FIG. 1.

Referring to FIG. 2, the tool 20 has a drive shaft 28 which carries a chuck 30 through which both rotational and axial forces are applied to the stud 22. The shaft 28 has a central bore 32 and the chuck 30 has a contoured lower end 34 which engages the stud 22.

Referring to FIGS. 3–5, the stud 22 comprises first and second bodies 36 and 38 made of dissimilar materials and, specifically, dissimilar metals. The first body 36 has a central axis, but can also be of other shapes. A collar or skirt 42 is located near one end of the shank 40 and preferably has a generally circular periphery 44 of predetermined diameter. The collar has a first surface 46, which is of generally truncated conical configuration in cross section, facing toward the other end of the shank 40. The surface 46 has engagable means shown in the form of grooves or flutes 48 which extend from the shank 40 substantially to the periphery 44. The chuck end 34 has cooperating engaging means which enable rotational forces to be applied to the stud 22 through the grooves 48. The chuck end 34 also is of generally truncated conical configuration to apply axial forces to the stud 22 through the collar 42. Engagable means other than the grooves 48 can be applied, for example, as disclosed more fully in Jenkins U.S. Pat. No. 4,850,772, issued July 25, 1989.

The collar 42 has a second surface 50 facing toward the one end of the shank 40 in a direction away from the first surface 46. The second surface 50 is annular and can be flat or have an annular channel therein in accordance with the aforesaid U.S. Pat. No. 4,850,772.

The first body 36 also has a central recess or cavity 52 which, in this instance, comprises a larger diameter cavity 54 opening at the second collar surface 50 and a bore 56 extending upwardly from the cavity 54 into the shank 40. The first body 36 has cooperating means for affixing the second body 38 thereto. In this instance, the cooperating means is shown in the form of internal threads 58 in the bore 56.

The second body 38 of the stud 22 includes friction-weldable nose or projection 60 which extends outwardly in the direction of the axis of the shank 40 away from the second surface 50 of the collar 42. The end of the nose 60 can be of suitable shape so as to be friction welded to the outer surface of the plate 26. The end of the nose 60 can also have ridges or serrations to help disperse coatings, dirt, or other contaminants on the surface of the workpiece as disclosed more fully in the aforesaid U.S. Pat. No. 4,850,772. In this instance, the second body 38 has a larger intermediate portion 62 received in the cavity 54 and a shank 64 extending upwardly therefrom with threads 66.

The threads 66 threadedly engage the threads 58 of the bore 56 to serve as cooperating means to affix the second body 38 to the first body 36. However, the cooperating means can be in many other forms, including non-circular portions on the shank 64 and in the bore 36 which are held by crimping or swaging, for example. The bodies 36 and 38 can also be affixed by welding, such as TIG or MIG techniques.

To affix the plate 24 to the plate 26, openings 68, preferably in the form of round holes, are prepunched or cut in place at locations where the plates are to affixed to one another. The largest dimension or diameter of the hole 68 is less than the largest dimension or diameter of the periphery 44 of the collar 42. The stud 22 is then positioned for welding with the end of the nose 60 of the body 38 centrally located in the hole 68 and in contact with the outer surface of the plate 26. The nose 60 of the stud body 38 is longer than the thickness of the plate 24 so that when the nose 60 is in contact with the plate 26, the annular surface 50 of the collar 42 is above the outer surface of the outer plate 24. As rotational and axial forces are then applied to the stud 22, the end of the nose 60 and the contiguous portion of the plate 26 become plastic to form a weld 70. The stud 22 moves toward the plates 24 and 26 until the surface 50 of the collar 42 engages the outer surface of the plate 24. Portions of these surfaces then become plastic to form an annular weld 72 between the plate and the collar. Portions of the two welds 70 and 72 thus occur simultaneously, although most of the weld 70 is formed first. The weld 72 forms a seal between the plate 24 and the stud 22 to prevent fluids from entering therebetween. Such fluids could otherwise cause corrosion which would greatly shorten the life of the joint.

In affixing the first plate 24 to the second plate 26, when made of dissimilar materials, the first body 36 of the stud 22 is made of a material which is compatible with the material of which the plate 24 is made and the second body 38 is made of a material which is compatible with the material of which the plate 26 is made. For flue gas desulfurization systems, it has been found that components of the systems, such as stacks, scrubbers, and ducts, can be lined with plates of titanium or certain nickel alloys to protect the underlying plates of carbon steel and greatly increase the life thereof. Thus, when the plate 24 is made of titanium and the plate 26 is of carbon steel, the first body 36 of the stud 22 is made of titanium and the second body 38 of the stud 22 is made of carbon steel. The first body 36 can thus be compatibly welded to the plate 24 and the second body 38 can be compatibly welded to the plate 26.

Various modifications of the above-described embodiments of the invention will be apparent to those skilled in the art, and it is to be understood that such modifications can be made without departing from the scope of the invention, if they are within the spirit and tenor of the accompanying claims.

I claim:

1. A friction-weldable composite stud for welding a first workpiece of one material to a second workpiece of another material, said stud comprising a first body of a first material which is compatible with said first workpiece, said first body having a collar extending outwardly therefrom, said collar having a first surface facing in one direction, said first surface being positioned transversely to the axis of the body for engagement by a chuck of a welding tool, said stud having engagable means for engagement by cooperating means of the chuck of the welding tool, whereby the tool can move said stud relative to a workpiece and apply an axial force to the stud through the chuck and the collar, said collar having a second surface facing away from said first surface and being annular, and said stud further comprising a second body made of a second material which is different than said first material and which is compatible with said second workpiece, said second body having a friction-weldable nose extending outwardly from said second surface of said collar, said second body being affixed to said first body for movement therewith.

2. A friction-weldable composite stud according to claim 1 wherein said first body has a bore centrally located therein with internal threads and said second body has cooperating external threads engaged with said internal threads.

3. A friction-weldable stud according to claim 1 wherein said first body has a central bore therein and said second body has a shank extending into said bore, said bore and said shank having cooperating means by which said second body is affixed to said first body.

4. A friction-weldable stud comprising a first body made of a first material having an elongate shank, a collar extending outwardly from said shank near one end thereof, said collar having a first surface facing toward the other end of said shank, said first surface having generally radially-extending grooves extending substantially from said shank to the periphery of said collar for engagement by a cooperating surface of a welding tool chuck, whereby axial and rotational forces can be applied to the stud through the chuck, said collar having a second surface facing away from said other end of said shank and being annular, and a second body made of a second material which is different than said first material, said second body having a weldable nose extending from said collar in a direction away from said shank, said nose having an axis which is substantially coaxial with an axis of said shank, and said second body and said first body having cooperating means for affixing said second body to said first body, whereby said first body and said second body can rotate and move axially together.

5. A friction-weldable stud according to claim 4 wherein said cooperating means comprises external threads on said second body and internal threads in said first body.

6. A friction-weldable stud according to claim 4 wherein said first body has a central bore therein and said second body has a shank extending into said bore, and said cooperating means is in said bore and on said second body shank.

7. A friction-weldable stud according to claim 4 wherein said first body is made of metal and said second body is made of a different metal.

8. A friction-weldable stud according to claim 4 wherein said first body has a cavity opening at said second surface of said collar and a bore extending from said cavity into said shank.

9. A friction-weldable stud according to claim 8 wherein said second body has an intermediate portion in said cavity and a shank extending into said bore.

10. A composite weldable stud for welding a first plate of predetermined thickness to a second plate, said stud comprising a first body of one material having a shank and a collar extending outwardly from said shank near one end thereof, a second body of a different material having a weldable nose extending from said first body in a direction away from said shank, said nose having an axis which is substantially coaxial with an axis of said shank, said nose having a length which is longer than the thickness of the first plate, and said second body and said first body having cooperating means for affixing said second body to said first body, whereby said first body and said second body can move together as a unit.

11. A friction weldable stud according to claim 10 wherein said first body is made of metal and said second body is made of a different metal.

12. A friction-weldable stud according to claim 10 wherein said cooperating means comprises external threads on said second body and internal threads in said first body.

13. A friction-weldable stud according to claim 10 wherein said first body has a central bore therein and said second body has a shank extending into said bore, and said cooperating means is in said bore and on said second body shank.

14. A method of affixing a first metal plate to a second metal plate made of a dissimilar method, said metal comprising providing a composite stud having a first body made of a metal compatible with said first plate, with said body having a collar extending outwardly of a predetermined diameter, said stud further having a second body of a metal compatible with said second plate, said second body comprising a generally cylindrical, friction-weldable nose extending outwardly from said collar substantially coaxially with an axis of said first body, said second body being affixed to said first body; forming a hole in said first plate of a diameter greater than the diameter of said nose and smaller than the diameter of said collar; placing said nose through said hole and into contact with said second plate; and welding said nose to said second plate and said collar to said first plate.

15. The method according to claim 14 characterized further by providing said nose with a length exceeding the thickness of said first plate.

16. The method according to claim 14 characterized by welding said nose and said collar by providing relative movement between said stud and said first and second plates while applying axial pressure to said stud until said nose is welded to said second plate and said collar is welded to said first plate around said hole.

17. A method of affixing a first plate of one material to a second plate of a different material, said method comprising providing a composite stud having a first body made of a material which is compatible with said first plate, said body having a collar, said stud further having a second body made of a material which is compatible with said second plate, said second body having a weldable nose extending beyond said first body away from said collar, said second body being affixed to said first body, said nose having a length exceeding the thickness of said first plate; forming a hole in said first plate of a size which is larger than the cross section of said nose and smaller than said collar; placing said nose through said hole and into contact with said second plate; and welding said nose to said second plate and said collar to said first plate.

18. The method according to claim 17 characterized further by welding said nose and said collar by providing relative movement between said stud and said first and second plates while applying a force on said stud until said nose is welded to said second plate and said collar is welded to said first plate around said hole.

* * * * *